(12) United States Patent
Suissa

(10) Patent No.: US 11,731,654 B2
(45) Date of Patent: Aug. 22, 2023

(54) VEHICLE CONTROL SYSTEMS AND METHODS

(71) Applicant: GM GLOBAL TECHNOLOGY OPERATIONS LLC, Detroit, MI (US)

(72) Inventor: Avshalom Suissa, Ganei Tikva (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 364 days.

(21) Appl. No.: 17/072,169

(22) Filed: Oct. 16, 2020

(65) Prior Publication Data

US 2022/0119008 A1    Apr. 21, 2022

(51) Int. Cl.
*B60W 60/00* (2020.01)
*B60W 40/109* (2012.01)
(Continued)

(52) U.S. Cl.
CPC ........ *B60W 60/0013* (2020.02); *B60W 10/04* (2013.01); *B60W 10/184* (2013.01); *B60W 10/20* (2013.01); *B60W 30/02* (2013.01); *B60W 40/109* (2013.01); *B60W 40/114* (2013.01); *G01C 21/3407* (2013.01); *B60W 2420/42* (2013.01); *B60W 2420/52* (2013.01); *B60W 2520/06* (2013.01); *B60W 2520/125* (2013.01); *B60W 2520/14* (2013.01); *B60W 2540/22* (2013.01)

(58) Field of Classification Search
CPC ............. B60W 60/0013; B60W 10/04; B60W 10/184; B60W 10/20; B60W 30/02; B60W 40/109; B60W 40/114; B60W 2420/42; B60W 2420/52; B60W 2520/06; B60W 2520/125; B60W 2520/14; B60W 2540/22; B60W 2720/125; B60W 2720/14; B60W 2720/403; B60W 2720/406; B60W 60/001; G01C 21/3407; B60T 8/17555; B60T 2210/32; B60T 7/22; B60T 8/26; B60T 8/17557
See application file for complete search history.

(56) References Cited

U.S. PATENT DOCUMENTS 9,645,577 B1 * 5/2017 Frazzoli ................ B60W 30/00
2020/0307582 A1 * 10/2020 Sato ...................... B60W 10/04
2021/0347382 A1 * 11/2021 Huang ............... B60W 60/0017

FOREIGN PATENT DOCUMENTS

JP          2014048859 A  *  3/2014

* cited by examiner

*Primary Examiner* — Nga X Nguyen
(74) *Attorney, Agent, or Firm* — Lorenz & Kopf LLP

(57) ABSTRACT

Methods and system for vehicle control. The methods and systems determining actuator commands data based on a vehicle stability and motion control function. The vehicle stability and motion control function having planned trajectory data, current vehicle position data and current vehicle heading data as inputs, having the actuator commands data as an output and utilizing a model predicting vehicle motion including predicting vehicle heading data and predicting vehicle position data. The actuator commands data includes steering and propulsion commands. The actuator commands data includes differential braking commands for each brake of the vehicle to correct for any differential between the planned vehicle heading and the current vehicle heading data or the predicted vehicle heading data. The methods and systems output the actuator commands data to the actuator system.

16 Claims, 4 Drawing Sheets

(51) Int. Cl.
*B60W 40/114* (2012.01)
*B60W 10/20* (2006.01)
*G01C 21/34* (2006.01)
*B60W 30/02* (2012.01)
*B60W 10/184* (2012.01)
*B60W 10/04* (2006.01)

VEHICLE CONTROL SYSTEMS AND METHODS

INTRODUCTION

The present disclosure generally relates to vehicles having differential braking for lateral stability control, and more particularly relates to methods and systems for determining differential braking actuator commands in an autonomous vehicle.

Electronic stability control (ESC) systems are a powerful safety addition to modern vehicles. ESC systems help drivers maintain control under compromising road conditions, challenging maneuvers and variations in driver responses or abilities. ESC systems are a computer-based technology that detects and reduces lateral vehicle skidding. An ESC system detects a loss of vehicle steering control and then applies appropriate braking individually at each wheel to help direct the vehicle in accordance with the driver's steering wheel input. More specifically, electronic stability control (ESC) systems operate by individually actuating the wheel brakes to induce a yaw moment on the car for the purpose of improving stability and performance. In order for the ESC system to accomplish this, the ESC system analyzes what the car is actually doing based on motion sensors, and what the car "should" be doing under ideal circumstances based on steering input.

Some ESC instrumentation includes a steering wheel position sensor, a lateral accelerometer, wheel speed sensors, a yaw rate sensor, sensors for brake and throttle inputs, and an enable/disable switch. The actuation is managed by an electronic control unit (ECU) and a hydraulic control unit (HCU). The ESC system can actuate wheel brake pressure as well as engine throttle to affect the dynamics of the car. Some ESC systems compare a driver's intended actions in steering, braking, and/or other actions with the vehicle's response. Such comparisons may utilize variables such as steering angle, yaw rates, lateral acceleration rates, and/or various other variables. The vehicle ESC system can then apply the brakes, reduce any excess engine power, and/or take other corrective measures.

Some autonomous vehicle (AV) designs propose maintenance of an existing ESC system as a separate module from an AV motion control module. That is, the ESC system will have, as inputs, steering commands output from the AV motion control module and sensed vehicle motion data from a sensing system so that significant modification of the ESC system from traditional human driver-based ESC systems is not necessary.

Accordingly, it is desirable to provide techniques for stabilizing an autonomous vehicle on a desired trajectory and leveraging predictable vehicle motion information to provide enhanced lateral vehicle stabilization. It is also desirable to provide methods, systems, and vehicles utilizing such techniques in a processing efficient manner. Furthermore, other desirable features and characteristics of the present invention will be apparent from the subsequent detailed description and the appended claims, taken in conjunction with the accompanying drawings and the foregoing technical field and background.

SUMMARY

In one aspect, a vehicle control system for a vehicle is provided. The vehicle includes front and rear wheels and brakes for each wheel. A processor is in operable communication with an actuator system of the vehicle. The actuator system includes steering, propulsion and braking systems. The processor executes program instructions. The program instructions cause the processor to receive planned trajectory data for the vehicle from a trajectory planning module. The planned trajectory data includes planned vehicle position data and planned vehicle heading data at discrete future time points. Current vehicle position data and current vehicle heading data is received from a sensing system. Actuator commands data is determined based on a vehicle stability and motion control function. The vehicle stability and motion control function has the planned trajectory data, the current vehicle position data and the current vehicle heading data as inputs, has the actuator commands data as an output and utilizes a model predicting vehicle motion including predicting vehicle heading data and predicting vehicle position data. The actuator commands data includes steering and propulsion commands. The actuator commands data additionally includes differential braking commands for each brake of the vehicle to correct for any differential between the planned vehicle heading and the current vehicle heading data and/or the predicted vehicle heading data. The actuator commands data is output to the actuator system.

In embodiments, the vehicle stability and motion control function includes a heading term representing a differential between planned vehicle heading data and current vehicle heading data and/or predicted vehicle heading data and a trajectory term representing a differential between planned vehicle position data and current vehicle position data and/or the predicted vehicle position data.

In embodiments, determining the actuator commands data is based on the vehicle stability and motion control function includes minimizing the vehicle stability and motion control function including the heading and trajectory terms.

In embodiments, the vehicle stability and motion control function is part of a Model Predictive Control (MPC) algorithm.

In embodiments, the vehicle stability and motion control function aggregates over a finite number of time iterations the heading term and the trajectory term. A first time iteration of the heading term is determined based on a differential between planned vehicle heading data and current vehicle heading data. A first time iteration of the trajectory term is determined based on a differential between planned vehicle position data and current vehicle position data. Future time iterations of the heading terms are determined based on a differential between planned vehicle heading data and predicted vehicle heading data. Future time iterations of the trajectory terms are determined based on a differential between planned vehicle position data and predicted vehicle position data;

In embodiments, the model predicting vehicle motion uses, as an input to the model, actuator commands data output from a previous time iteration to predict vehicle position and vehicle heading.

In embodiments. the vehicle stability and motion control function includes an actuator commands change rate term representing a rate of change the actuator commands data.

In embodiments, the vehicle stability and motion control function includes a passenger comfort figure of merit term representing an inverse of passenger comfort.

In embodiments, the vehicle stability and motion control function includes a yaw rate term representing a differential between a planned yaw rate and at least one of a current yaw rate and a predicted yaw rate.

In embodiments, the vehicle stability and motion control function includes a lateral velocity term and a lateral acceleration term. The lateral velocity term represents a differential between a planned lateral velocity and a current lateral velocity and/or a predicted lateral velocity. The lateral acceleration term represents a differential between a planned lateral acceleration and a current lateral acceleration and/or a predicted lateral acceleration.

In embodiments, determining the actuator commands data is performed by solving the vehicle stability and motion control function using quadratic programming.

In another aspect, a method for controlling a vehicle is provided. The vehicle includes front and rear wheels and brakes for each wheel. The method is processor executed and includes the following steps. Planned trajectory data for the vehicle is received from a trajectory planning module. The planned trajectory data includes planned vehicle position data and planned vehicle heading data at discrete future time points. Current vehicle position data and current vehicle heading data is received from a sensing system of the vehicle. Actuator commands data is determined based on a vehicle stability and motion control function. The vehicle stability and motion control function has the planned trajectory data, the current vehicle position data and the current vehicle heading data as inputs, has the actuator commands data as an output and utilizes a model predicting vehicle motion including predicting vehicle heading data and predicting vehicle position data. The actuator commands data includes steering and propulsion commands and additionally includes differential braking commands for each brake of the vehicle to correct for any differential between the planned vehicle heading data and the current vehicle heading data and/or the predicted vehicle heading data. The actuator commands data is output to the actuator system.

In embodiments, the vehicle stability and motion control function includes a heading term representing a differential between planned vehicle heading data and current vehicle heading data and/or predicted vehicle heading data and a trajectory term representing a differential between planned vehicle position data and current vehicle position data and/or the predicted vehicle position data.

In embodiments, determining the actuator commands data based on the vehicle stability and motion control function includes minimizing the vehicle stability and motion control function including the heading and trajectory terms.

In embodiments, the vehicle stability and motion control function is part of a Model Predictive Control algorithm (MPC).

In embodiments, the vehicle stability and motion control function aggregates over a finite number of time iterations the heading term and the trajectory term. A first time iteration of the heading term is determined based on a differential between planned vehicle heading data and current vehicle heading data. A first time iteration of the trajectory term is determined based on a differential between planned vehicle position data and current vehicle position data. Future time iterations of the heading terms are determined based on a differential between planned vehicle heading data and predicted vehicle heading data. Future time iterations of the trajectory terms are determined based on a differential between planned vehicle position data and predicted vehicle position data. The model predicting vehicle motion uses, as an input to the model, actuator commands data output from a previous time iteration to predict vehicle position and vehicle heading.

The vehicle stability and motion control function includes an actuator commands change rate term representing a rate of change the actuator commands data.

In embodiments, the vehicle stability and motion control function includes a passenger comfort figure of merit term representing an inverse of passenger comfort.

In embodiments, the vehicle stability and motion control function includes a yaw rate term representing a differential between a planned yaw rate and a current yaw rate and/or a predicted yaw rate.

In embodiments, the vehicle stability and motion control function includes a lateral velocity term and/or a lateral acceleration term. The lateral velocity term represents a differential between a planned lateral velocity and a current lateral velocity and/or a predicted lateral velocity. The lateral acceleration term represents a differential between a planned lateral acceleration and a current lateral acceleration and/or a predicted lateral acceleration.

In another aspect, a vehicle is provided. The vehicle includes front wheels, rear wheels, brakes for each wheel, an actuator system including steering, propulsion and braking systems, and a sensing system. A processor is in operable communication with the actuator system and the sensing system. The processor executes program instructions. The program instructions cause the processor to receive planned trajectory data for the vehicle from a trajectory planning module. The planned trajectory data includes planned vehicle position data and planned vehicle heading data at discrete future time points. Current vehicle position data and current vehicle heading data are received from the sensing system. Actuator commands data is determined based on a vehicle stability and motion control function. The vehicle stability and motion control function has the planned trajectory data, the current vehicle position data and the current vehicle heading data as inputs, has the actuator commands data as an output and utilizes a model predicting vehicle motion including predicting vehicle heading data and predicting vehicle position data. The actuator commands data includes steering and propulsion commands and differential braking commands for each brake of the vehicle to correct for any differential between the planned vehicle heading and the current vehicle heading data and/or the predicted vehicle heading data. The actuator commands data is output to the actuator system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
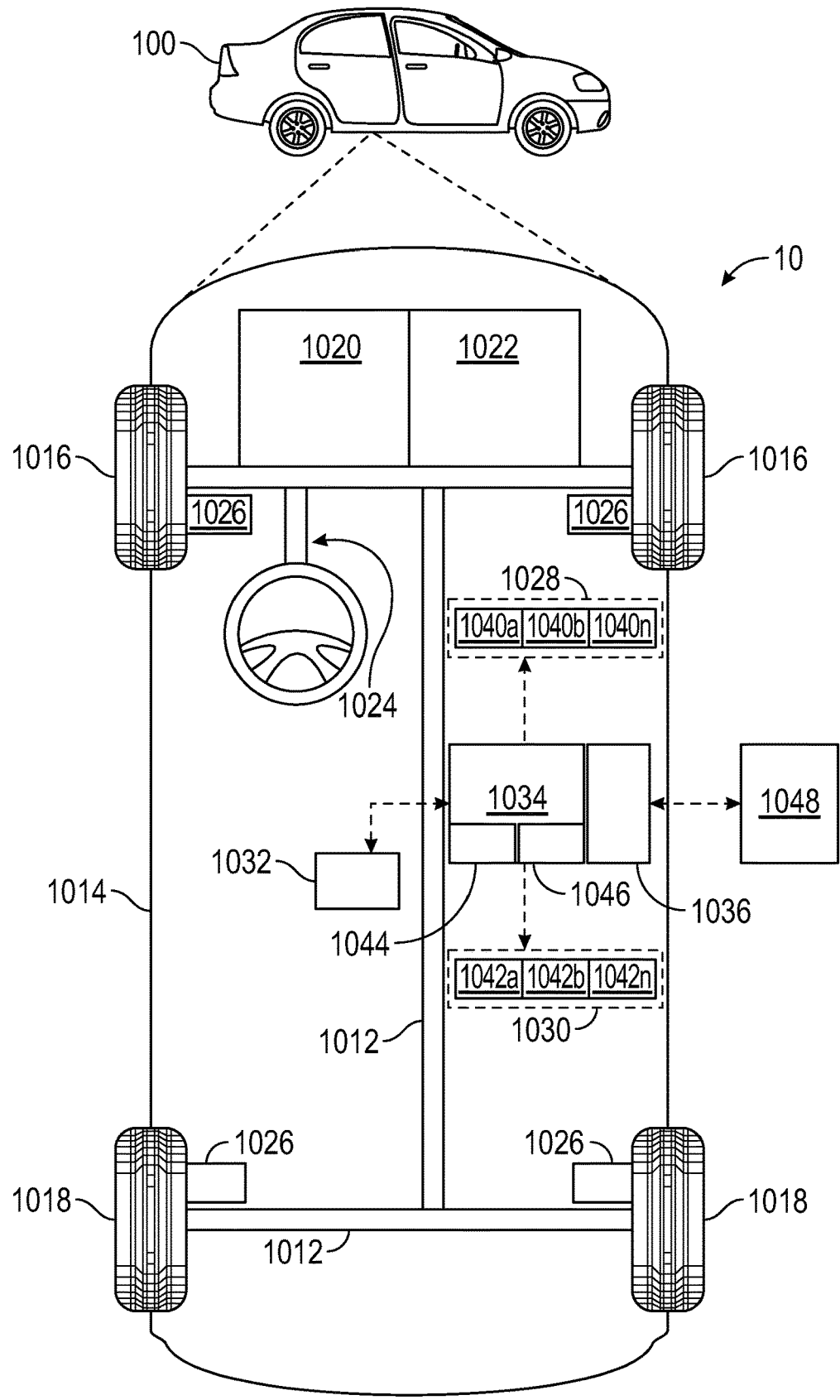
FIG. 1 is a functional block diagram illustrating an autonomous vehicle having a vehicle stability and motion control module, in accordance with various embodiments.

With reference to FIG. 1, a vehicle control system shown generally at 10 is associated with a vehicle 1010 in accordance with various embodiments. In general, the vehicle control system 10 combines an ESC with an AV motion controller into one controller/one brain to enhance stability and reduce costs. Such a flat control architecture will ensure optimal coordination of all actuators in a single control solution, stabilizing the vehicle on a desired path by optimally exploiting available resources (including tire forces, steering, engine torque, brakes, etc.). In embodiments, the vehicle control system 10 uses a Model Predictive Control (MPC) architecture in autonomous driving, which takes into account future virtual driver commands. Future driver commands are predictable as they are part of the MPC problem formulation, which is to be contrasted with unpredictable future human steering commands. This allows lateral stability to be achieved with greater efficiency and smoothness. In embodiments described herein, the desired yaw rate and desired velocity is known in the form of a trajectory ahead of the vehicle determined by a route planning module. In some embodiments, skidding is allowed in a controlled way during extreme maneuvers, which is facilitated since the vehicle control system 10 has all needed information about the trajectory and the vehicle state unlike conventional ESC systems. The vehicle control system 10 includes a multi input multi output (MIMO) control (such as an MPC) solution for integrated vehicle motion and ESC control. An advantage of using the MPC framework is that optimal and safe maneuvers are ensured due, at least in part, to the ability of MPC to optimize in real-time a given performance index (such as passenger comfort) subject to constraints (in particular, obstacle avoidance and stability constraints). Further, having motion and stability control in one controller can save costs with a reduced requirement for additional Electronic Control Units (ECUs).

As depicted in FIG. 1, the vehicle 1010 generally includes a chassis 1012, a body 1014, front wheels 1016, and rear wheels 1018. The body 1014 is arranged on the chassis 1012 and substantially encloses components of the vehicle 1010. The body 1014 and the chassis 1012 may jointly form a frame. The wheels 1016-1018 are each rotationally coupled to the chassis 1012 near a respective corner of the body 1014.

In various embodiments, the vehicle 1010 is an autonomous vehicle and the vehicle control system 10 is incorporated into the autonomous vehicle 1010 (hereinafter referred to as the autonomous vehicle 1010). The autonomous vehicle 1010 is, for example, a vehicle that is automatically controlled to carry passengers from one location to another. The vehicle 1010 is depicted in the illustrated embodiment as a passenger car, but it should be appreciated that any other vehicle including trucks, sport utility vehicles (SUVs), recreational vehicles (RVs), etc., can also be used. In an exemplary embodiment, the autonomous vehicle 1010 is a so-called Level Three, Level Four or Level Five automation system. Level 3 automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 1010 generally includes a propulsion system 1020, a transmission system 1022, a steering system 1024, a braking system 1026, a sensing system 1028, an actuator system 1030, at least one data storage device 1032, at least one controller 1034, and a communication system 1036. The propulsion system 1020 may, in various embodiments, include an internal combustion engine, an electric machine such as a traction motor, and/or a fuel cell propulsion system. The transmission system 1022 is configured to transmit power from the propulsion system 1020 to the vehicle wheels 1016-1018 according to selectable speed ratios. According to various embodiments, the transmission system 1022 may include a step-ratio automatic transmission, a continuously-variable transmission, or other appropriate transmission. The braking system 1026 is configured to provide braking torque to the vehicle wheels 1016-1018. The braking system 1026 may, in various embodiments, include friction brakes, brake by wire, a regenerative braking system such as an electric machine, and/or other appropriate braking systems. The steering system 1024 influences a position of the of the vehicle wheels 1016-1018. While depicted as including a steering wheel for illustrative purposes, in some embodiments contemplated within the scope of the present disclosure, the steering system 1024 may not include a steering wheel.

The sensing system 1028 includes one or more sensing devices 1040a-40n that sense observable conditions of the exterior environment and/or the interior environment of the autonomous vehicle 1010. The sensing devices 1040a-40n can include, but are not limited to, radars, lidars, global positioning systems, optical cameras, thermal cameras, ultrasonic sensors, and/or other sensors. The actuator system 1030 includes one or more actuator devices 42a-42n that control one or more vehicle features such as, but not limited to, the propulsion system 1020, the transmission system 1022, the steering system 1024, and the braking system 1026. In various embodiments, the vehicle features can further include interior and/or exterior vehicle features such as, but are not limited to, doors, a trunk, and cabin features such as air, music, lighting, etc. (not numbered).

The communication system 1036 is configured to wirelessly communicate information to and from other entities 1048, such as but not limited to, other vehicles ("V2V" communication,) infrastructure ("V2I" communication), remote systems, and/or personal devices. In an exemplary embodiment, the communication system 1036 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 1032 stores data for use in automatically controlling the autonomous vehicle 1010. In various embodiments, the data storage device 1032 stores defined maps of the navigable environment. In various embodiments, the defined maps may be predefined by and obtained from a remote system. For example, the defined maps may be assembled by the remote system and communicated to the autonomous vehicle 1010 (wirelessly and/or in a wired manner) and stored in the data storage device 1032. As can be appreciated, the data storage device 1032 may be part of the controller 1034, separate from the controller 1034, or part of the controller 1034 and part of a separate system.

The controller 1034 includes at least one processor 1044 and a computer readable storage device or media 1046. The processor 1044 can be any custom made or commercially available processor, a central processing unit (CPU), a graphics processing unit (GPU), an auxiliary processor among several processors associated with the controller 1034, a semiconductor based microprocessor (in the form of a microchip or chip set), a macroprocessor, any combination thereof, or generally any device for executing instructions. The computer readable storage device or media 1046 may include volatile and nonvolatile storage in read-only memory (ROM), random-access memory (RAM), and keep-alive memory (KAM), for example. KAM is a persistent or non-volatile memory that may be used to store various operating variables while the processor 1044 is powered down. The computer-readable storage device or media 1046 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 1034 in controlling the autonomous vehicle 1010.

The instructions may include one or more separate programs, each of which comprises an ordered listing of executable instructions for implementing logical functions. The instructions, when executed by the processor 1044, receive and process signals from the sensing system 1028, perform logic, calculations, methods and/or algorithms for automatically controlling the components of the autonomous vehicle 1010, and generate control signals to the actuator system 1030 to automatically control the components of the autonomous vehicle 1010 based on the logic, calculations, methods, and/or algorithms. Although only one controller 1034 is shown in FIG. 1, embodiments of the autonomous vehicle 1010 can include any number of controllers 1034 that communicate over any suitable communication medium or a combination of communication mediums and that cooperate to process the sensor signals, perform logic, calculations, methods, and/or algorithms, and generate control signals to automatically control features of the autonomous vehicle 1010.

Figure 3:
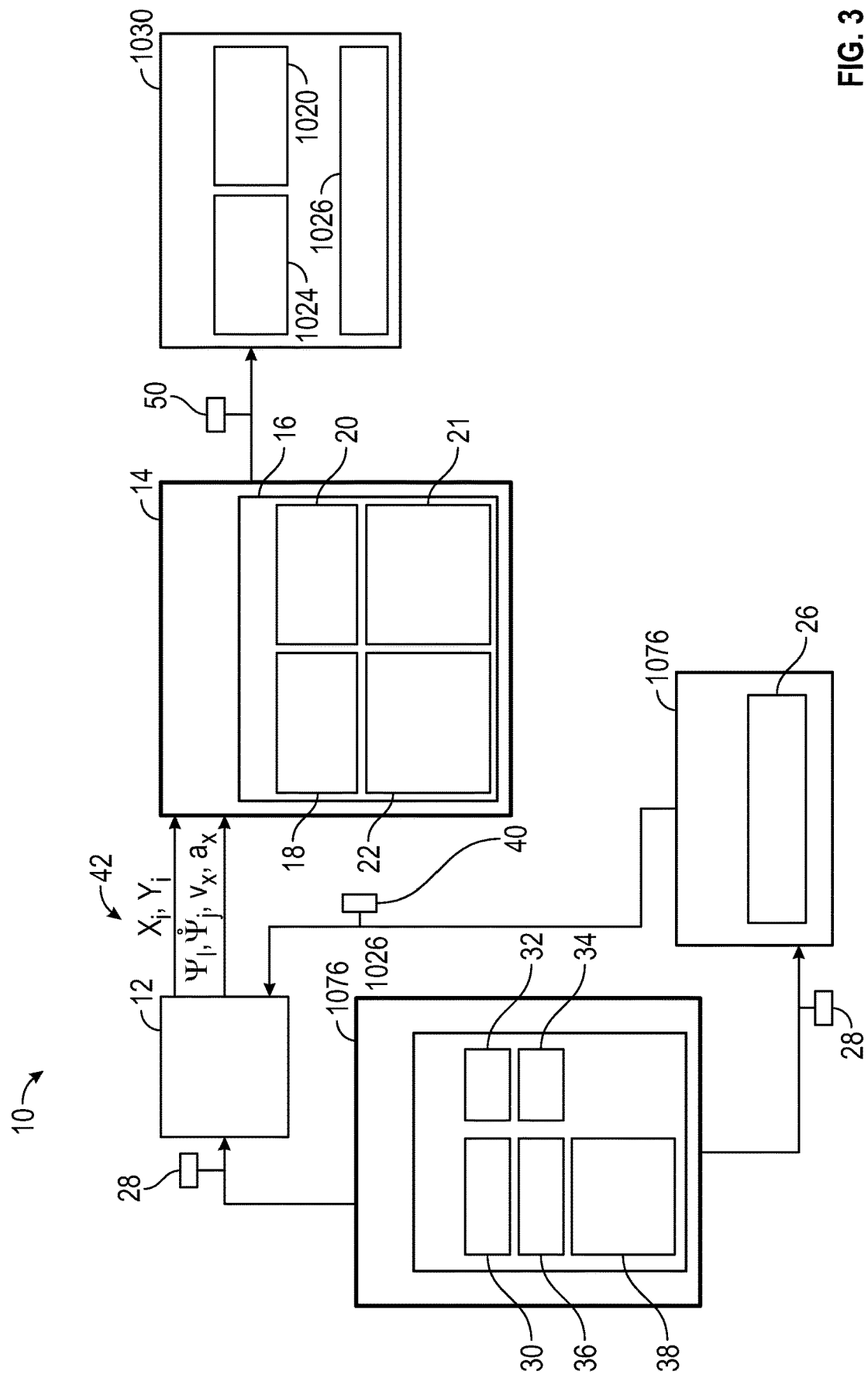
FIG. 3 is a diagram of a vehicle control system including the vehicle stability and motion control module, in accordance with various embodiments.
Figure 5:
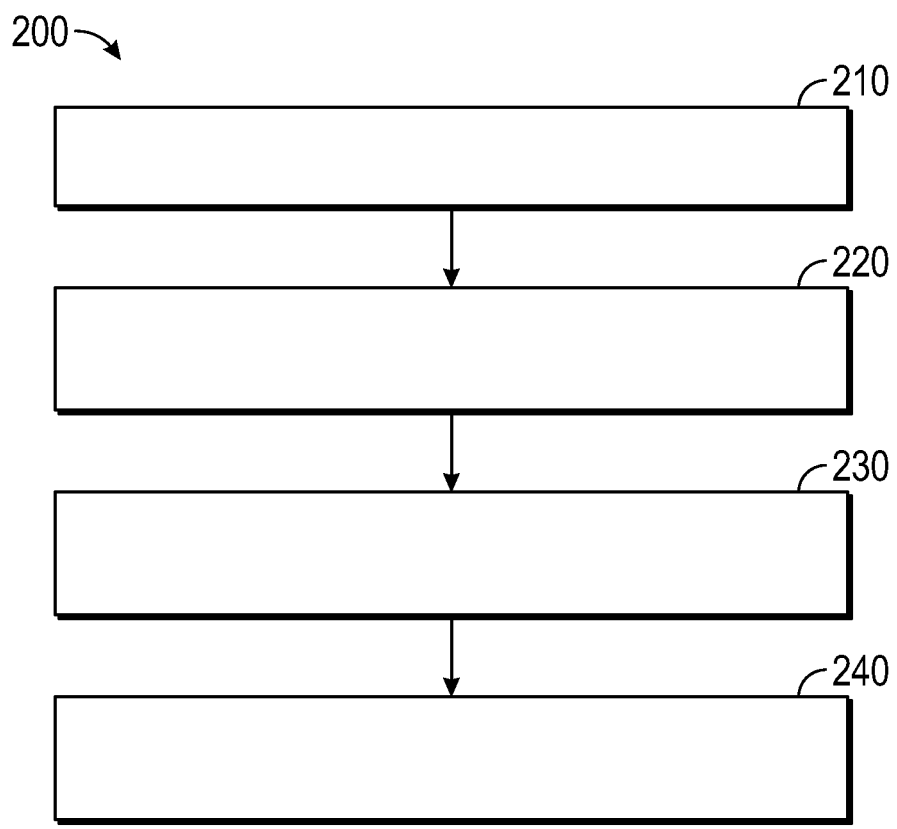
FIG. 5 is a flowchart illustrating a vehicle control method for controlling the autonomous vehicle, in accordance with various embodiments.

In various embodiments, one or more instructions of the controller 1034 are embodied in the vehicle control system 10 and, when executed by the processor 1044, implement modules as described with respect to FIG. 3 and method steps as described with respect to FIG. 5.

In various embodiments, the autonomous vehicle 1010 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 1010 may be associated with an autonomous vehicle based remote transportation system. In accordance with an example use case workflow, a registered user can create a ride request via a user device. The ride request will typically indicate the passenger's desired pickup location (or current GPS location), the desired destination location (which may identify a predefined vehicle stop and/or a user-specified passenger destination), and a pickup time. A remote transportation system receives the ride request, processes the request, and dispatches a selected autonomous vehicles (when and if one is available) to pick up the passenger at the designated pickup location and at the appropriate time.

As can be appreciated, the subject matter disclosed herein provides certain enhanced features and functionality to what may be considered as a standard or baseline autonomous vehicle 1010. To this end, an autonomous vehicle can be modified, enhanced, or otherwise supplemented to provide the additional features described in more detail below.

Figure 2:
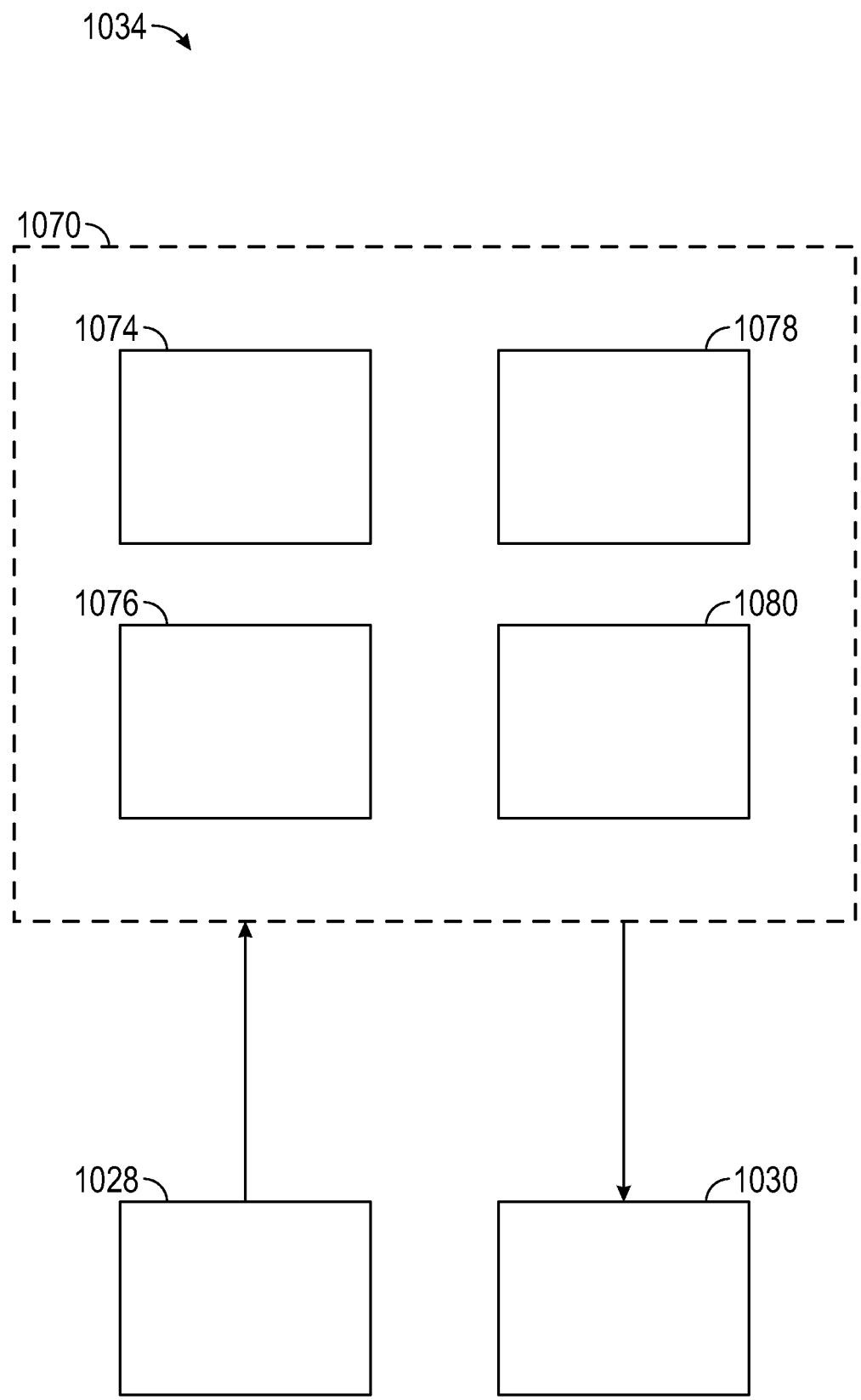
FIG. 2 is a dataflow diagram illustrating an autonomous driving system that includes the vehicle stability and motion control module, in accordance with various embodiments.

In accordance with various embodiments, controller 1034 implements an autonomous driving system (ADS) 1070 as shown in FIG. 2. That is, suitable software and/or hardware components of controller 1034 (e.g., processor 1044 and computer-readable storage device 1046) are utilized to provide an autonomous driving system 1070 that is used in conjunction with vehicle 1010.

In various embodiments, the instructions of the autonomous driving system 1070 may be organized by function or system. For example, as shown in FIG. 2, the autonomous driving system 1070 can include a sensor fusion system 1074, a positioning system 1076, a guidance system 1078, and a vehicle stability and motion control module 1080. As can be appreciated, in various embodiments, the instructions may be organized into any number of systems (e.g., combined, further partitioned, etc.) as the disclosure is not limited to the present examples.

In various embodiments, the sensor fusion system 1074 synthesizes and processes sensor data and predicts the presence, location, classification, and/or path of objects and features of the environment of the vehicle 1010. In various embodiments, the sensor fusion system 1074 can incorporate information from multiple sensors, including but not limited to cameras, lidars, radars, and/or any number of other types of sensors.

The positioning system 1076 processes sensor data along with other data to determine a position (e.g., a local position relative to a map, an exact position relative to lane of a road, vehicle heading, velocity, etc.) of the vehicle 1010 relative to the environment. The guidance system 1078 processes sensor data along with other data to determine a path for the vehicle 1010 to follow. The vehicle stability and motion control module 1080 generates control signals for controlling the vehicle 1010 according to the determined path.

In various embodiments, the controller 1034 implements machine learning techniques to assist the functionality of the controller 1034, such as feature detection/classification, obstruction mitigation, route traversal, mapping, sensor integration, ground-truth determination, and the like.

The vehicle stability and motion control module 1080 is configured to communicate a vehicle control output to the actuator system 1030. In an exemplary embodiment, the actuators 1042 include a steering control, a shifter control, a throttle control, and a brake control. The steering control may, for example, control a steering system 1024 as illustrated in FIG. 1. The shifter control may, for example, control a transmission system 1022 as illustrated in FIG. 1. The throttle control may, for example, control a propulsion system 1020 as illustrated in FIG. 1. The brake control may, for example, control a wheel braking system 1026 as illustrated in FIG. 1.

As mentioned briefly above, the autonomous driving system 1070 is included within the vehicle control system 10. The vehicle control system 10 of various embodiments of the present disclosure integrates ESC and AV motion control into a single controller. That is, future vehicle trajectory is obtained from a trajectory planning module, which allows current and future state of the vehicle 1010, and current and future actuator commands, to be determined and predicted using a vehicle motion model. The current and future state of the vehicle includes a difference between intended vehicle heading, which is known based on the vehicle trajectory, and current and predicted vehicle heading. The current and future actuator commands includes differential braking in that braking on each side of a longitudinal centerline of the vehicle 1010 and optionally also on each side of the lateral centerline of the vehicle 1010, is unequal to provide for lateral stability control in the event of a potential oversteer ("spinning out") or understeer ("plowing out") or other lateral skidding condition. A vehicle stability and motion control function is solved to determine actuator commands that simultaneously take into account heading differential and tracking differential based on the current and future state of the vehicle and the current and future actuator commands. The determined actuator commands are output to the actuator system 1030.

The vehicle control system 10 of the present disclosure is illustrated in greater detail in FIG. 3, in accordance with an exemplary embodiment. The vehicle control system 10 includes a trajectory planning module 12, a vehicle stability and motion control module 14, the sensor fusion system 1074, the positioning system 1076 and the actuator system 1030. The vehicle control system 10 plans a trajectory for the vehicle 1010. The planned trajectory includes at least position data and heading data for each time spaced data point. A vehicle stability and motion control function assesses the impact of a number of sets of actuator commands data with respect to departure of the predicted trajectory from the planned trajectory by predicting, using a vehicle motion model, the vehicle trajectory when a set of actuator commands are followed. The vehicle control system 10 selects and outputs the set of actuator commands that simultaneously minimize departure of the predicted position from the planned position and departure of the predicted heading from the planned heading, among other terms to be minimized in the vehicle stability and motion control function.

The trajectory planning module 12 is included as part of the guidance system 1078. The sensor fusion system 1076 provides sensor data 28 to the trajectory planning module 12. The sensor data 28 may be generated based on data from the sensing system 1028 including one or more cameras 30, a global positioning system (GPS) receiver 32, lidar system 36, inertial measurement unit 34 and vehicle Controller Area Network (CAN) data 38. The trajectory planning module 12 further receives localization and mapping data from the positioning system 1076, which includes a mapping module 26. The mapping module 26 provides a navigation function for planning a route relative to a map from a start location to a destination location. The positioning system 1076 is able to locate the vehicle 1010 relative to the route and the map. This localization and mapping data 40 provides a base route by which the trajectory planning module 12 generates more detailed instructions for autonomous driving. In particular, the trajectory planning module 12 further takes into account the perceived environment based on the sensor data 28 such as traffic signs, obstacles, traffic, etc. The trajectory planning module 12 outputs planned trajectory data 42 based on the sensor data 28 and the localization and mapping data 40.

Figure 4:
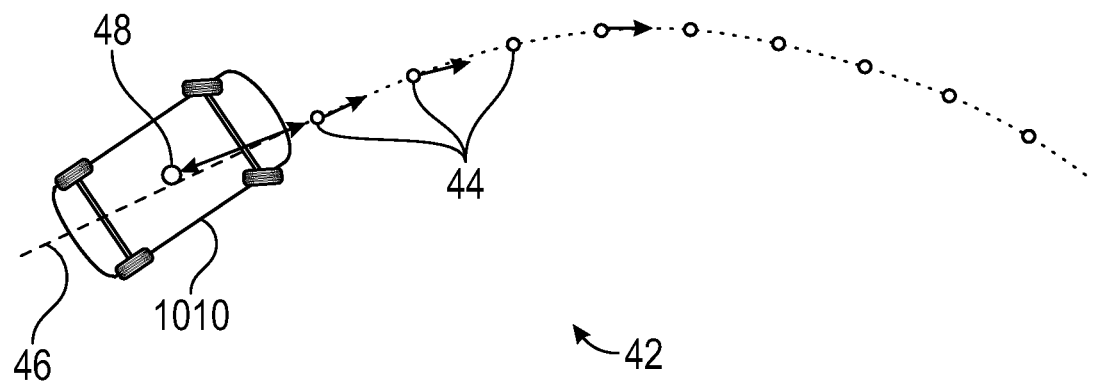
FIG. 4 is a schematic depiction of a planned trajectory from a trajectory planning module of the vehicle control system, in accordance with an exemplary embodiment.

Exemplary planned trajectory data 42 is depicted in FIG. 4, which illustrates a series of waypoints 44 making up the planned trajectory data 42. Each waypoint 44 is made up of a vector of data including, for example, position data x, y (in an x (lateral) direction and a perpendicular y (longitudinal) direction), heading $\psi$, yaw rate, $\dot{\psi}$ (which is a time derivative of heading), velocity $v_x$, $v_y$ (in the x and y directions) and acceleration $a_x$, $a_y$ (in the x and y directions). Each waypoint can be designated as an ith waypoint in the series. Further illustrated in FIG. 4 is the planned heading 46 of the vehicle 1010, which is the direction of movement of the vehicle 1010 along the planned trajectory. The current position 48 (and heading) of the vehicle 1010 can be measured based on sensor data 28 by the position system 1076 and is included in the localization and mapping data 40.

The vehicle stability and motion control module 14 is configured to receive the planned trajectory data 42, to process the planned trajectory data 42 and to output actuator commands embodied by actuator commands data 50. The vehicle stability and motion control module 14 aims to generate the actuator commands data 50 to follow the planned trajectory as closely as possible whilst also taking into account other factors such as lateral stability, passenger comfort and actuator constraints. As such, the actuator commands data 50 may not necessarily result in the vehicle 1010 precisely following the requested path defined by the planned trajectory data 42. The vehicle stability and motion control module 14 utilizes a Model Predictive Control (MPC) algorithm 16, which minimizes a vehicle stability and motion control function. The vehicle stability and motion control function includes a plurality of terms representing factors that should be minimized when generating the actuator commands data 50 including a heading term 18, a trajectory term 20, a passenger comfort term 22 and an actuator commands change term 24. The heading term 18 represents a difference between the planned heading and current and predicted heading of the vehicle 1010. The trajectory term 20 represents a difference between the planned position and the current and predicted position of the vehicle 1010. The passenger comfort term 22 represents a smoothness of predicted vehicle motion. The actuator commands change term 24 represents an amount of change in the actuator commands data. The vehicle stability and motion control function assesses each term with respect to many sets of different actuator commands and utilizes a model of vehicle motion in order to predict the impact on, for example, the vehicle heading and the vehicle position as a result of executing a given set of actuator commands. The vehicle stability and motion control function minimizes an aggregate sum of each of the terms over a finite number of time spaced iterations and selects the set of output commands associated with the minimum, which are output as the actuator commands data 50.

The MPC algorithm 16 obtains actuators commands data 50 by repeatedly solving an open loop finite-horizon optimal control problem. The MPC algorithm 16 allows for real-time optimization of a given performance index while taking into account a vehicle motion model and constraints on actuators and outputs. The performance index may embody at least a differential between planned and current/predicted heading and differential between planned and current/predicted vehicle position. The vehicle position, heading and other vehicle outputs are predicted using a vehicle motion model that may be a simplified vehicle dynamics model. Any suitable vehicle motion model that is capable of predicting at least vehicle heading and vehicle position from a set of actuator commands may be used. The vehicle model may be a set of non-linear standard deferential equations or any other form, for example an RL-Model. The vehicle motion model may also predict velocity and yaw rate. The MPC algorithm 16 applies constraints on the actuator commands to reflect physical limits of the actuator system 1030 and the planned trajectory. For example, there may be a maximum deviation from the planned trajectory as one constraint, maximum and minimum values for various actuators of the actuator system, maximum rates of change for the actuators, impermissible locations for the vehicle 1010 (such as overlap with a perceived obstacle), maximum and/or minimum values for outputs of the vehicle (such as speed), etc.

The MPC algorithm 16 aims to find a best control sequence (set of actuator commands) over a future horizon of N time steps of k. At each sample time, the state x(t) is estimated to minimize a performance index J subjected to a vehicle motion prediction model and constraints. The MPC algorithm 16 resolves to a numerical optimization problem that may be solved using quadratic programming. An example vehicle stability and motion control function employed by the MPC algorithm is:

$$J=\Sigma_{i=1}^{N}w_{xi}(r_i-x_i)^2+\Sigma_{i=1}^{N}w_{ui}(\Delta u_i)^2 \qquad \text{(equation 1)}$$

$$u_{opt}=\min_u J \qquad \text{(equation 2)}$$

In equation 1, the first term represents a difference between planned vehicle state $r_1$ and current vehicle state $x_1$ at a current time instant and a difference between planned vehicle state $r_2$ to N and predicted vehicle state $x_{2\ to\ N}$ at future time instances. i is the time slot for the calculation. The planned vehicle state is obtainable from the trajectory planning module 12 and includes $x_i$, $y_i$, $\psi_i$, $\dot{\psi}$, v and a. The predicted vehicle state is obtainable from the vehicle motion model. The second summation term in equation 1 represents an amount of change in the actuator commands. Accordingly, the MPC algorithm 16 generates actuator commands data 50 so as to factor in lateral stability (including a difference between target and current/predicted heading) and concordance of the current/predicted vehicle position with that prescribed by the planned trajectory, simultaneously. According to equation 2, an optimal set of actuator commands $u_{opt}$ are selected such that the cost function J is minimized and output as actuator commands data 50. Other terms may be included in the vehicle stability and motion control function J including fuel consumption, ride smoothness and any other factor that is of value to optimize. Equations 1 and 2 are subject to:

$$x_{k+1}=f(x^k,u^k) \qquad \text{(equation 3)}$$

$$y_k=g(x_k) \qquad \text{(equation 4)}$$

$$u_{min} \leq u_k \leq u_{max} \qquad \text{(equation 5)}$$

$$y_{min} \leq y_k \leq y_{max} \qquad \text{(equation 6)}$$

Equations 3 and 4 represent the vehicle motion prediction model and equations 5 and 6 represent the constraints. Equation 3 determines the vehicle state at the next time iteration when a given set of actuator commands are output. Equation 4 determines the vehicle output having regard to a particular vehicle state. u is a set of actuator commands, x is a state of the vehicle 1010 and y is an output of the vehicle 1010 (such as position, velocity, heading, lateral acceleration, etc.). The vehicle stability and motion control function J iterates over all reasonable sets of sequences of actuator commands over the time window of N steps (and thus a sequence of N sets of actuator commands). The function J determines a performance index for each set of actuator commands. The MPC algorithm 16 finds the optimal set and sequence of actuator commands by minimizing the performance index. After solving the optimization problem presented by equations 1 to 5 to determine an optimal sequence of sets of actuator commands u(t), u(t+1), . . . , u(t+N−1), only the first optimal set u(t) is output in the actuator commands data 50 and applied by the actuator system 1030. The remaining actuator commands in the sequence are discarded. The optimization problem outlined above is solved by quadratic programming in one embodiment of the present disclosure.

The exemplary embodiment of the vehicle control system 10 of FIG. 3 is included in the autonomous driving system 1070. The autonomous driving system 1070 is configured to execute steering and speed control maneuvers, amongst other possible autonomous driving possibilities, to avoid collisions and to move cooperatively with tracked objects based in part on the actuator commands data 50. In particular, the actuator commands data 50 includes differential braking commands to correct for lateral stability issues (including spinning out and plowing out) where a planned heading differs from an actual and/or predicted heading. The autonomous driving system 1070 operates known autonomous vehicle control computer instructions through a processor based in part on the actuator commands data 50, as described above with respect to FIG. 2.

FIG. 5 shows a flow chart describing exemplary method and system aspects of the present disclosure for controlling the vehicle 1010. The steps of the flow chart of FIG. 5 can be implemented by computer program instructions stored on a computer readable medium executed by a processor such as the at least one processor 1044. The steps may be carried out by the modules and systems described with respect to FIG. 3 for example and may also take in further aspects of the autonomous driving system 1070 described with respect to FIG. 2.

The flow chart describes an exemplary method 200 for controlling the vehicle 1010. In step 210 the planned trajectory data 42 is received. The planned trajectory data 42 is generated by the trajectory planning module 12 based on localization of the vehicle 1010 from the positioning system 1076, perception of the environment from the sensor fusion system 1074 and a desired route from the mapping module 26. The planned trajectory data 42 includes at least position and heading data for the vehicle 1010 at each of time steps 1 to N. The planned trajectory data 42 may additionally include velocity and acceleration data.

In step 220, actuator commands data 50 is determined by the vehicle stability and motion control module 14. In one embodiment, the vehicle stability and motion control module 14 computes the vehicle stability and motion control cost function J, which takes, as inputs, current position and heading data for the vehicle 1010 from the sensing system 1028 for time step i=1, the planned trajectory data 42 and the predicted position and heading data for time steps i=2 to N, which can be derived based on the vehicle motion prediction models of equations 3 and 4. The vehicle stability and control cost function J (equation 1) is minimized to determine an optimal set of actuator commands embodied in actuator commands data 50. That is, the vehicle stability and motion control module executes an MPC algorithm 16 that repeatedly solves a finite horizon optimal control problem in the form of a cost function that takes into account predicted position and predicted heading difference from that planned for a given set of actuator commands subject to a vehicle motion prediction model and constraints on actuator commands and vehicle output. The MPC algorithm 16 may apply quadratic programming to solve the numerical optimization problem presented by the vehicle stability and motion control cost function J.

In step 230, optimal actuator commands data 50 is output to the actuator system 1030. When the vehicle stability and motion control module 14 detects a lateral stability issue (implicitly through factoring in a difference between planned and predicted vehicle heading), this may be corrected, at least in part, by application of differential braking. Thus, the actuator commands data 50 includes potentially different braking commands for respective brakes associated with respective ones of the front left, front right, rear left and rear right wheels. In step 240, differential braking is applied by the braking system 1026 based on the actuator commands data 50. For example, braking force may be biased to a front right, a front left, a rear right or a rear left of the vehicle 1010 depending on the nature of the lateral stability correction required.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle control system for a vehicle including front and rear wheels and brakes for each wheel, comprising:
   at least one processor in operable communication with an actuator system of the vehicle, the actuator system including steering, propulsion and braking systems, the at least one processor configured to execute program instructions, wherein the program instructions are configured to cause the at least one processor to:
   receive planned trajectory data for the vehicle from a trajectory planning module, the planned trajectory data including planned vehicle position data and planned vehicle heading data at discrete future time points;
   receive current vehicle position data and current vehicle heading data from a sensing system;
   determine actuator commands data based on a vehicle stability and motion control function, the vehicle stability and motion control function having the planned trajectory data, the current vehicle position data and the current vehicle heading data as inputs, having the actuator commands data as an output and utilizing model predictive control (MPC) to predict vehicle motion including predicting vehicle heading data and predicting vehicle position data and to maintain stability of the vehicle through the actuator commands to the steering, propulsion and braking systems;
   wherein the actuator commands data includes steering and propulsion commands and wherein the actuator commands data includes differential braking commands for each brake of the vehicle to correct for any differential between the planned vehicle heading and at least one of the current vehicles heading data and the predicted vehicle heading data;
   outputting the actuator commands data to the actuator system, and
   wherein the vehicle stability and motion control function includes a heading term representing a differential between planned vehicle heading data and at least one of current vehicle heading data and predicted vehicle heading data and a trajectory term representing a differential between planned vehicle position data and at least one of the current vehicle position data and the predicted vehicle position data.

2. The vehicle control system of claim 1, wherein determining the actuator commands data based on the vehicle stability and motion control function includes minimizing the vehicle stability and motion control function including the heading and trajectory terms.

3. The vehicle control system of claim 1, wherein the vehicle stability and motion control function aggregates over a finite number of time iterations the heading term and the trajectory term, wherein:
   a first time iteration of the heading term is determined based on a differential between planned vehicle heading data and current vehicle heading data;
   a first time iteration of the trajectory term is determined based on a differential between planned vehicle position data and current vehicle position data;
   future time iterations of the heading terms are determined based on a differential between planned vehicle heading data and predicted vehicle heading data;
   future time iterations of the trajectory terms are determined based on a differential between planned vehicle position data and predicted vehicle position data;
   wherein the model predicting vehicle motion uses, as an input to the model, actuator commands data output from a previous time iteration to predict vehicle position and vehicle heading.

4. The vehicle control system of claim 1, wherein the vehicle stability and motion control function includes an actuator commands change term representing a rate of change of the actuator commands data.

5. The vehicle control system of claim 1, wherein the vehicle stability and motion control function includes a passenger comfort figure of merit term representing an inverse of passenger comfort.

6. The vehicle control system of claim 1, wherein the vehicle stability and motion control function includes a yaw rate term representing a differential between a planned yaw rate and at least one of a current yaw rate and a predicted yaw rate.

7. The vehicle control system of claim 1, wherein the vehicle stability and motion control function includes at least one of a lateral velocity term and a lateral acceleration term, wherein the lateral velocity term represents a differential between a planned lateral velocity and at least one of a current lateral velocity and a predicted lateral velocity, and wherein the lateral acceleration term represents a differential between a planned lateral acceleration and at least one of a current lateral acceleration and a predicted lateral acceleration.

8. The vehicle control system of claim 1, wherein determining the actuator commands data is performed by solving the vehicle stability and motion control function using quadratic programming.

9. A method for controlling a vehicle including front and rear wheels and brakes for each wheel, the method comprising:
  receiving, via at least one processor, planned trajectory data for the vehicle from a trajectory planning module, the planned trajectory data including planned vehicle position data and planned vehicle heading data at discrete future time points;
  receiving, via the at least one processor, current vehicle position data and current vehicle heading data from a sensing system of the vehicle;
  determining, via the at least one processor, actuator commands data based on a vehicle stability and motion control function, the vehicle stability and motion control function having the planned trajectory data, the current vehicle position data and the current vehicle heading data as inputs, having the actuator commands data as an output and utilizing model predictive control (MPG) to predict vehicle motion including predicting vehicle heading data and predicting vehicle position data and to maintain stability of the vehicle through the actuator commands to the steering, propulsion and braking systems;
  wherein the actuator commands data includes steering and propulsion commands and wherein the actuator commands data includes differential braking commands for each brake of the vehicle to correct for any differential between the planned vehicle heading data and at least one of the current vehicles heading data and the predicted vehicle heading data; and
  outputting the actuator commands data to the actuator system;
  wherein the vehicle stability and motion control function include a heading term representing a differential between planned vehicle heading data and at least one of current vehicle heading data and predicted vehicle heading data and a trajectory term representing a differential between planned vehicle position data and at least one of the current vehicle position data and the predicted vehicle position data.

10. The vehicle control system of claim 9, wherein determining the actuator commands data based on the vehicle stability and motion control function includes minimizing the vehicle stability and motion control function including the heading and trajectory terms.

11. The method of claim 9, wherein the vehicle stability and motion control function aggregates over a finite number of time iterations the heading term and the trajectory term, wherein:
  a first time iteration of the heading term is determined based on a differential between planned vehicle heading data and current vehicle heading data;
  a first time iteration of the trajectory term is determined based on a differential between planned vehicle position data and current vehicle position data;
  future time iterations of the heading terms are determined based on a differential between planned vehicle heading data and predicted vehicle heading data;
  future time iterations of the trajectory terms are determined based on a differential between planned vehicle position data and predicted vehicle position data;
  wherein the model predicting vehicle motion uses, as an input to the model, actuator commands data output from a previous time iteration to predict vehicle position and vehicle heading.

12. The method of claim 9, wherein the vehicle stability and motion control function includes an actuator commands change term representing a rate of change the actuator commands data.

13. The method of claim 9, wherein the vehicle stability and motion control function includes a passenger comfort figure of merit term representing an inverse of passenger comfort.

14. The method of claim 9, wherein the vehicle stability and motion control function includes a yaw rate term representing a differential between a planned yaw rate and at least one of a current yaw rate and a predicted yaw rate.

15. The method of claim 9, wherein the vehicle stability and motion control function includes at least one of a lateral velocity term and a lateral acceleration term, wherein the lateral velocity term represents a differential between a planned lateral velocity and at least one of a current lateral velocity and a predicted lateral velocity, and wherein the lateral acceleration term represents a differential between a planned lateral acceleration and at least one of a current lateral acceleration and a predicted lateral acceleration.

16. A vehicle, comprising:
  front wheels;
  rear wheels;
  brakes for each wheel;
  an actuator system including steering, propulsion and braking systems;
  a sensing system; and
  at least one processor in operable communication with the actuator system and the sensing system, the at least one processor configured to execute program instructions, wherein the program instructions are configured to cause the at least one processor to:
  receive planned trajectory data for the vehicle from a trajectory planning module, the planned trajectory data including planned vehicle position data and planned vehicle heading data at discrete future time points;
  receive current vehicle position data and current vehicle heading data from the sensing system;
  determine actuator commands data based on a vehicle stability and motion control function, the vehicle stability and motion control function having the planned trajectory data, the current vehicle position data and the current vehicle heading data as inputs, having the actuator commands data as an output and utilizing model predictive control (MPC) to predict vehicle motion including predicting vehicle heading data and predicting vehicle position data and to maintain stability of the vehicle through the actuator commands to the steering, propulsion and braking systems;

wherein the actuator commands data includes steering and propulsion commands and wherein the actuator commands data includes differential braking commands for each brake of the vehicle to correct for any differential between the planned vehicle heading and at least one of the current vehicle heading data and the predicted vehicle heading data; and outputting the actuator commands data to the actuator system;

wherein the vehicle stability and motion control function include a heading term representing a differential between planned vehicle heading data and at least one of current vehicle heading data and predicted vehicle heading data and a trajectory term representing a differential between planned vehicle position data and at least one of the current vehicle position data and the predicted vehicle position data.

* * * * *